March 17, 1925.

R. A. NORLING

REMOVABLE WEAR BUSHING FOR CYLINDERS

Filed Dec. 18, 1922

1,529,911

Inventor
Reinhold A. Norling
by Eugene Evans Atty.

Patented Mar. 17, 1925.

1,529,911

UNITED STATES PATENT OFFICE.

REINHOLD A. NORLING, OF AURORA, ILLINOIS, ASSIGNOR TO INDEPENDENT PNEU-MATIC TOOL COMPANY, OF CHICAGO, ILLINOIS, A CORPORATION OF DELAWARE.

REMOVABLE WEAR BUSHING FOR CYLINDERS.

Application filed December 18, 1922. Serial No. 607,619.

*To all whom it may concern:*

Be it known that I, REINHOLD A. NORLING, a citizen of the United States, residing at Aurora, in the county of Kane and State of Illinois, have invented new and useful Improvements in Removable Wear Bushings for Cylinders, of which the following is a specification.

This invention relates to removable wear bushings for cylinders in which pistons or like parts have movement.

The invention has particular reference to cylinders of portable pneumatic drills, and has for its main object to provide novel means for removably holding the bushings in the cylinders of such tools so that the life and usefulness of the latter may be prolonged by being able to readily replace worn bushings by new ones.

In the accompanying drawings—

Figure 1:
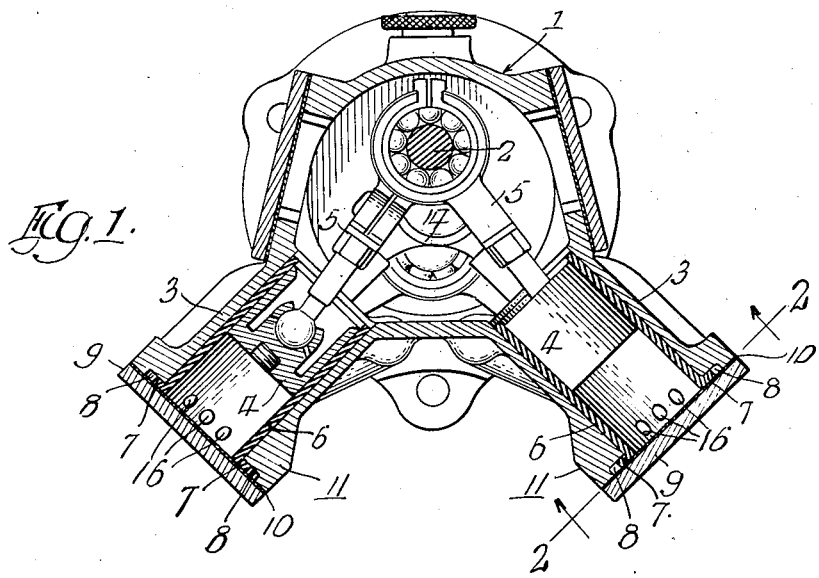
Fig. 1 is a cross-sectional view through a pneumatic drill, the power cylinders of which are provided with removable wear bushings of my invention.

In the drawings, 1 indicates the outside casing of a pneumatic drill, 2 the crank shaft journaled therein and by which the drill spindle (not shown) is turned, 3, 3 the power cylinders on opposite sides of the crank shaft and at angles thereto, 4 the pistons reciprocating in said cylinders, and 5 the connecting rods connecting the pistons with the crank shaft.

Each cylinder 3 is lined with a removable wear bushing 6 having the length of the cylinder or a length covering the entire stroke of the piston 4, and an inside diameter conforming to the outside diameter of the piston 4. The cylinder 3 has an inside diameter large enough to receive the bushing 6.

Said bushing 6 is made of metal having suitable wear resisting properties, such as required in tools of this character, and is provided at its outer end with outwardly extending lugs 7, 7. These, as shown in the drawings, are diametrically arranged and seat in recesses 8, 8 provided in the outer end of the cylinder 3. The outer end of the cylinder is open to allow the bushing 6 to be pressed into the same, and the lugs 7, 7 seating in the recesses 8, 8 limit the movement of the bushing into the cylinder. Said lugs also hold the bushing against turning.

The lugs 7 and recesses 8 are of such dimensions that the outer end of the bushing 6 is flush with the corresponding end of the cylinder 3, and are held in said recesses by a cap plate 9. This is bolted or otherwise secured over the outer end of the cylinder 3 and closes the same and seats against the lugs 7, 7 to hold the bushing 6 in place and against outward movement. A gasket or packing 10 is between the plate 9 and the cylinder 3 to prevent leakage.

Figure 2:
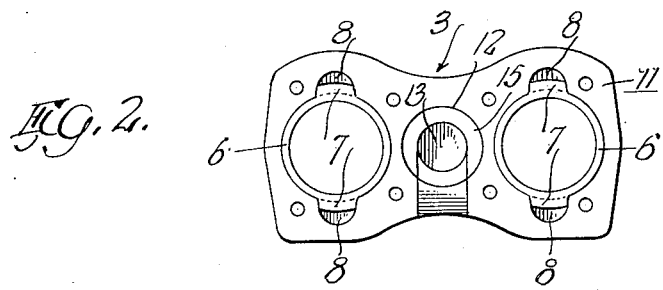
Fig. 2 is a top plan view taken on line 2—2 of Fig. 1.

As shown in Fig. 2, two cylinders 3 are in a cylinder block 11 and two are on each side of the crank shaft with the bore 12 for the controlling valve 13 between them. This valve is reciprocated by an eccentric 14 on the crank shaft 2 (Fig. 1). The valve bore or cylinder 12 is lined with a wear bushing 15. This bushing has its outer end flush with the open outer end of its cylinder 12 and is held in place by the cap plate 7. The latter extends over both power cylinders 3 and the valve cylinder 12.

Figure 3:
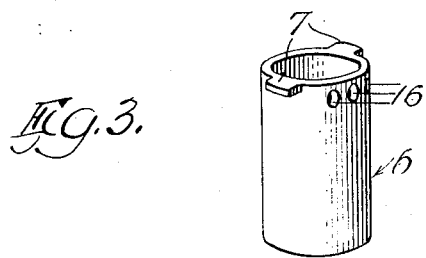
Fig. 3 is a perspective view of one of the removable bushings.

The valve 13 controls the supply and exhaust of compressed air or other motive fluid to and from the power cylinders 3 on opposite sides of it, and in this connection each bushing 6 has a number of ports 16, 16 on one side and adjacent its upper end, as shown in Fig. 3.

As shown in Figs. 1 and 2, the recesses 8, 8 are slightly longer than the lugs 7, 7 to permit a screw driver or other implement to be inserted under the lugs for lifting a bushing 6 from its cylinder from its outer end. The lugs 7 in holding the bushings against turning hold the ports 16 therein always in register with those in the cylinder block 11.

The power cylinders 3, 3 wear out the quickest in tools of the kind herein mentioned, and by the use of removable wear bushings 6, 6 the life and usefulness of the tools may be prolonged by replacing, from time to time, worn bushings 6 by new ones.

I claim as my invention:

1. In combination with a cylinder block having two power cylinders and an interposed valve cylinder therein, all of said cylinders having their outer ends opening through the same end of said block, a wear bushing in each of said power and valve cylinders, the bushings in the power cylinders having outwardly projecting lugs seating in recesses in the cylinder block, and a single cap plate secured to the block over the power and valve cylinders for closing the same and engaging the outer ends of said bushings and the lugs for holding the bushings in their respective cylinders.

2. In combination with a cylinder, a wear bushing lining the inner wall of the cylinder and being removably inserted through the open outer end thereof, said bushing having lugs at its outer end and seating in recesses in the outer end of the cylinder, and a cap plate secured to the cylinder over the outer end thereof and engaging said lugs for clamping the same in said recesses and holding the bushing in said cylinder, said recesses being longer than said lugs to allow for lifting the bushing out of the cylinder from the outer end thereof.

In testimony that I claim the foregoing as my invention, I affix my signature, this 12th day of Dec., A. D. 1922.

REINHOLD A. NORLING.